(12) United States Patent
Didillon et al.

(10) Patent No.: US 6,255,548 B1
(45) Date of Patent: *Jul. 3, 2001

(54) PROCESS FOR SELECTIVE HYDROGENATION OF UNSATURATED COMPOUNDS

(75) Inventors: Blaise Didillon; Fabienne Le Peltier, both of Rueil Malmaison (FR)

(73) Assignee: Institut Francais du Petrole, Rueil Malmaison Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/182,659

(22) Filed: Oct. 30, 1998

(30) Foreign Application Priority Data

Oct. 31, 1997 (FR) .................................................. 97 13687

(51) Int. Cl.$^7$ .............................. C07C 5/03; C10G 35/04
(52) U.S. Cl. .......................... 585/259; 585/259; 585/260; 585/261; 585/262; 585/500; 585/501; 208/134; 208/138
(58) Field of Search ..................................... 585/259, 260, 585/261, 500, 501; 208/134, 138

(56) References Cited

U.S. PATENT DOCUMENTS

| | | | |
|---|---|---|---|
| 2,426,604 | * 9/1947 | Ferel | 585/259 |
| 3,200,167 | * 8/1965 | Reich | 585/260 |
| 3,297,776 | * 1/1967 | Reich et al. | 585/262 |
| 3,669,875 | * 6/1972 | Plank et al. | 208/65 |
| 3,830,726 | * 8/1974 | Weisang et al. | 208/138 |
| 3,929,683 | * 12/1975 | Antos | 208/138 |
| 3,992,468 | * 11/1976 | Cosyns et al. | 585/489 |
| 4,409,410 | * 10/1983 | Cosyns et al. | 585/259 |
| 4,507,401 | * 3/1985 | Dubois et al. | 502/242 |
| 4,513,098 | * 4/1985 | Tsao | 502/216 |
| 4,548,918 | 10/1985 | Bournonville et al. | 502/154 |
| 4,645,752 | 2/1987 | Defresne et al. | 502/66 |
| 4,658,080 | * 4/1987 | McFarland | 585/260 |
| 4,691,070 | * 9/1987 | Nakamura et al. | 585/259 |
| 4,727,216 | * 2/1988 | Miller | 585/660 |
| 4,737,262 | * 4/1988 | Franck et al. | 208/65 |
| 5,417,844 | * 5/1995 | Boitaux | 585/260 |
| 5,456,822 | * 10/1995 | Marcilly et al. | 208/136 |
| 5,510,550 | * 4/1996 | Cheung et al. | 585/259 |
| 5,679,241 | * 10/1997 | Stanley | 585/262 |

FOREIGN PATENT DOCUMENTS 2 495 605    6/1982   (FR) .

* cited by examiner

Primary Examiner—Helane Myers
(74) Attorney, Agent, or Firm—Millen, White, Zelano & Branigan, P.C.

(57) ABSTRACT

A process for selective hydrogenation of unsaturated compounds such as acetylenic compounds or diolefins is carried out in the presence of a catalyst comprising at least one support, at least one metal from group VIII of the periodic table and at least one additional element M selected from the group formed by germanium, tin, lead, rhenium, gallium, indium, gold, silver and thallium. The process is characterized in that the catalyst is prepared using a process in which said metal M is introduced in an aqueous solvent, in the form of at least one organometallic compound comprising at least one carbon-M bond.

21 Claims, No Drawings

PROCESS FOR SELECTIVE HYDROGENATION OF UNSATURATED COMPOUNDS

The present invention relates to a novel process for selective hydrogenation of acetylenic or dienic compounds, in particular those contained in cuts from processes for cracking in the presence of a catalyst comprising at least one support, at least one metal from group VIII of the periodic table, and at least one additional element M selected from the group formed by germanium, tin, lead, rhenium, gallium, indium, gold, silver and thallium. The catalyst can also contain a further metallic element such as an alkali or alkaline-earth metal and/or a metalloid such as sulphur and/or a halogen or a halogen-containing compound.

Catalyst formulations used in processes for converting hydrocarbons have been the subject of a very large number of studies. Patents and publications which demonstrate that the addition of promoters to a base metal improves the quality of catalysts exist in large numbers.

For selective hydrogenation catalysts, catalysts comprising, in addition to a support, a metal such as palladium, nickel or platinum and at least one additional metal M (French patent FR-A-2 495 605) such as tin, germanium, lead, rhenium, gallium, indium, gold or silver have long been known. Such catalysts, known as bimetallic catalysts, perform better as regards activity and/or selectivity than that of catalysts containing only the principal metal (palladium, platinum or nickel).

Such elements are added in different forms such as mineral salts or organometallic compounds. The manner in which such modifiers are introduced is not unimportant as it dictates the properties of the catalyst to a great extent. Thus a metal M is advantageously introduced using an organometallic compound of that metal M. Such a technique for introducing a metal M has been described in the Applicant's U.S. Pat. No. 4,548,918. Metal M is introduced in the form of at least one organometallic compound selected from the group formed by complexes, in particular carbonyl, or polyketone complexes of metals M and metal hydrocarbyls of metal M such as alkyls, cycloalkyls, aryls, metal alkylaryls and metal arylalkyls.

Introducing additional metal M in the form of an organometallic compound leads to more effective catalysts but necessitates the use of an organic solvent. The impregnating solvent described in U.S. Pat. No. 4,548,918 is selected from the group formed by oxygen-containing organic solvents containing 2 to 8 carbon atoms per molecule, paraffin, naphthene or aromatic hydrocarbons essentially containing 6 to 15 carbon atoms per molecule, and halogen-containing oxygen-containing organic compounds containing 1 to 15 carbon atoms per molecule. Such solvents can be to used alone or mixed together.

In the present invention we have discovered that particularly effective catalysts can be prepared by introducing metal M in the form of an organometallic complex which is soluble in an aqueous solvent. This represents a considerable advance as regards ease of use during manufacture of the catalyst. Using large quantities of organic solvents has many disadvantages as regards safety (flammability, toxicity) and as regards costs.

The support for the catalyst of the invention comprises at least one refractory oxide which is generally selected from oxides of metals from groups IIA, IIIA, IIIB, IVA or IVB of the periodic table such as oxides of magnesium, aluminium, silicon, titanium, zirconium or thorium, used alone or mixed together or mixed with oxides of other elements from the periodic table. Charcoal can also be used.

Alumina constitutes the preferred support, the specific surface area of which is advantageously in the range 5 to 400 $m^2$ per gram, preferably in the range 5 to 100 $m^2$ per gram.

In addition to a support, the catalyst of the invention includes:

a) at least one group VIII metal selected from nickel, palladium, platinum, rhodium, ruthenium and iridium. Palladium, nickel and platinum are preferred.

The percentage by weight is in the range 0.01% to 50%, preferably in the range 0.05% to 1% if the metal is a noble metal and in the range 5% to 30% if the metal is nickel.

b) at least one additional element M selected from the group formed by germanium, tin, lead, rhenium, gallium, indium, silver, gold and thallium. Tin, germanium, silver and gold are preferred elements. The percentage by weight is in the range 0.01% to 10%, preferably in the range 0.02% to 5%. In some cases, at least two of the metals from this group can be used at once.

The catalyst can also contain 0.1% to 3% by weight of an alkali or alkaline-earth metal such as potassium or sodium and/or 0.01 % to 2% by weight of an element such as sulphur.

The catalyst can be prepared using different procedures for impregnating the support and the invention is not limited to any specific impregnation procedure. When several solutions are used, intermediate drying and/or calcining steps can be carried out.

The additional element M can be introduced during production of the support. One method, for example, consists of blending the moist powdered support with catalyst precursors and then forming and drying.

The group VIII metal, additional metal M, optional alkali or alkaline-earth metal, optional halogen or halogen-containing compound, and optional metalloid, can be introduced simultaneously or successively. In accordance with the invention, the characteristic feature of contact with the organometallic element M is that it is introduced in an aqueous solvent.

The precursor of element M can be selected from the group formed by halogen-containing compounds, hydroxides, oxides, carbonates and carboxylates of organometallic compounds of element M, this list not being limiting in nature. These compounds comprise at least one carbon-M bond. The precursor for element M can also be selected from compounds with general formula $(R_1)_x M(R_2)_y$ where x+y=the valency of metal M and where $R_1$ is selected from the group formed by alkyl, cycloalkyl, aryl, alkylaryl and arylalkyl functions, and $R_2$ is a function with formula $C_a H_b R'_c$, where R' represents a hydroxide, carboxylate, $PO_3H$ or $SO_3H$ function.

In one preparation technique in accordance with the invention, the catalyst is obtained by impregnating the support using an aqueous or organic solution of at least one group VIII metal compound, the volume of the solution preferably being in excess with respect to the retention volume of the support, or equal to that volume. The impregnated support is then filtered, optionally washed with distilled water, then dried and cacined in air, normally between 110° C. and about 500° C., then reduced in hydrogen at a temperature which is normally in the range about 20° C. to about 600° C., preferably between about 50° C. and about 450° C. The product obtained is then impregnated with an aqueous solution of a compound of tin, germanium, lead, rhenium, gallium, indium, gold, silver or thallium. Particularly advantageously, an aqueous solution of a carboxylate compound of tin is used, for example tributyl tin acetate.

After leaving the support impregnated with the group VIII metal in contact with the solution containing at least one compound of element M for several hours, the product is filtered, optionally washed with water, then dried. The operation is normally completed by calcining between 300° C. and 600° C., preferably in a stream of fair for several hours.

In a further technique in accordance with the invention, the catalyst is obtained by impregnating using an aqueous solution of at least one compound of said metal M, the volume of the solution preferably being equal to the retention volume of the support, more preferably in excess with respect to that volume. Particularly advantageously, an aqueous solution of a tin carboxylate compound is used. After leaving the solid in contact with the impregnating solution for several hours, the product is then dried. The final step is usually calcining between 300° C. and 600° C., preferably in a stream of air for several hours. The solid obtained is then impregnated using an aqueous or organic solution of at least one group VIII metal compound, the volume of the solution preferably being in excess with respect to the retention volume of the support, or equal to that volume. After several hours of contact, the product obtained is dried and calcined in air between 300° C. and 600° C., preferably in a stream of air for several hours.

Before use, the catalyst is reduced in hydrogen, for example between 20° C. and 600° C., to obtain an active metallic phase. The procedure for this treatment consists, for example, in slowly raising the temperature in a stream of hydrogen up to the maximum reduction temperature, for example in the range 20° C. to 600° C., preferably in the range 90° C. to 450° C., followed by maintaining that temperature for 1 to 6 hours, for example.

This reduction can be carried out immediately after calcining or later at the user's location. It is also possible to directly reduce the dried product at the user's location.

It is also possible to carry out prior reduction of the group VIII metal compound in solution using organic molecules with a reducing nature such as formic acid. The compound of additional element M can then be introduced simultaneously or successively. One possibility consists of filtering then drying the catalyst obtained. It can then be calcined followed by reduction under the conditions described above. It is also possible to carry out direct reduction from the dried product.

In accordance with the invention, the catalyst described above is used in processes for selective hydrogenation of cuts containing acetylenic or dienic compounds. Selective hydrogenation processes can eliminate highly unsaturated compounds present in cuts from catalytic, thermal or steam cracking processes to upgrade cuts either as polymerisation feeds, or as a product which can be used as a base for motor spirit.

Typical feeds which can be treated are $C_2$, $C_3$ or $C_4$ steam cracking cuts; steam cracking gasoline cuts, $C_3$, $C_4$ or $C_5$ cuts or catalytic cracking gasolines. The feed is generally brought into contact with the catalyst of the present invention at a temperature in the range 20° C. to 200° C. The mass flow rate of the treated feed per unit mass of catalyst can be in the range 0.1 to 10 kg/kg/h. The operating pressure can be fixed between atmospheric pressure and 6 MPa.

The following examples illustrate the invention without in any way limiting its scope.

EXAMPLE 1

Two catalysts A and B were prepared, comprising 0.3% by weight of palladium and 0.3% by weight of tin. The support was an alumina with a specific surface area of 70 $m^2$ per gram.

Catalyst A (Comparative)

Catalyst A was prepared using prior art techniques. 80 $cm^3$ of an aqueous solution of palladium nitrate was added to 100 g of alumina support. The catalyst was then dried at 110° C., calcined at 450° C. in air and reduced at 450° C. in a stream of hydrogen. The catalyst was subsequently placed in a reactor containing toluene. Tetrabutyltin was injected at 20° C. After 4 hours under these conditions, the catalyst was filtered, washed, dried and reduced at 450° C.

Catalyst B (in Accordance with the Invention)

Catalyst B was prepared using the techniques described above with the exception that the tin was introduced in the form of tributyltin acetate ($Bu_3SnOC(O)CH_3$). 80 $cm^3$ of an aqueous palladium nitrate solution was added to 100 g of alumina support. The catalyst was dried at 110° C.; calcined at 450° C. in air and reduced at 450° C. in a stream of hydrogen. The catalyst was then placed in a reactor containing an ammonia solution at pH 10. The tin precursor was injected at 20° C. The pressure was raised to 4 MPa and the temperature to 100° C.. After 20 minutes under these conditions, the reaction mixture was filtered, washed, dried and reduced at 450° C.

EXAMPLE 2

Catalysts A and B were tested using an isoprene hydrogenation reaction in a perfectly stirred reactor under the following operating conditions:

feed: n-heptane+isoprene temperature: 65° C.

pressure: 1 MPa

The results obtained under these conditions are shown in Table 1. The yields are expressed in mole % after 1 hour of operation.

TABLE 1

| Catalysts | Conversion (%) | Selectivity (%) | |
|---|---|---|---|
| | | n-methylbutane | n-methylbutene |
| A | 100 | 2 | 98 |
| B | 100 | 5 | 95 |

The catalytic performance the move easily manufactured of catalyst B prepared in accordance with the invention in an aqueous medium from an organometallic precursor was close to or even slightly superior than that of catalyst A.

What is claimed is:

1. In a process comprising selectively hydrogenating a feed comprising at least one of an acetylenic compound and a diolefin in the presence of a catalyst comprising at least one support, at least one metal from group VIII of the periodic table and at least one additional element M selected from the group formed by germanium, tin, lead, rhenium, gallium, indium, thallium, gold, and silver, the improvement comprising preparing said catalyst by introducing said additional element M into an aqueous solvent in the form of at least one water-soluble organometallic compound comprising at least one carbon-M bond.

2. A process according to claim 1, in which the catalyst further contains at least one alkali or alkaline-earth metal.

3. A process according to claim 1, in which the catalyst further contains at least one metalloid.

4. A process according to claim 1, in which the catalyst further contains at least one halogen or halogen-containing compound.

5. A process according to claim 1 in which in the catalyst, the group VIII metal is selected from nickel, palladium, platinum, rhodium, ruthenium and iridium.

6. A process according to claim 1 in which in the catalyst, element M is germanium, tin, silver or gold.

7. A process according to claim 1 in which in a catalyst, the precursor of element M is selected from the group consisting of hydroxides, halogen-containing compounds, carboxylates of organic compounds of element M, compounds with general formula $(R_1)_x M(R_2)_y$ where x+y=the valency of metal M and where $R_1$ is selected from the group formed by alkyl, cycloalkyl, aryl, alkylaryl and arylalkyl functions, and $R_2$ is a function with formula $C_a H_b R'_c$, where R' represents a hydroxide, carboxylate, $PO_3H$ or $SO_3H$ function.

8. A process according to claim 7 in which the catalyst, a precursor of element M is a carboxylate of an organic compound of element M.

9. A process according to claim 8 in which in the catalyst, the precursor of element M is tributyltin acetate.

10. A process according to claim 1, in which during preparation of the catalyst, the group VIII metal, additional element M, optional halogen or halogen-containing compound, optional alkali or alkaline-earth metal, and optional metalloid are introduced into the support successively or simultaneously.

11. A process according to claim 1, in which the catalyst is prepared by carrying out the following steps in any order:
    impregnating a support using an aqueous or organic solution of at least one group VIII metal, filtering, drying, calcining in air, and reducing in hydrogen;
    impregnating the product obtained using an aqueous solution of a compound of additional element M, filtering, drying, optionally reducing, then calcining.

12. A process according to claim 1, in which when preparing the catalyst, additional element M is introduced during production of the support.

13. A process according to claim 1, in which the catalyst is reduced in hydrogen at a temperature in the range 20° C. to 600° C.

14. A process according to claim 1, in which prior reduction of the group VIII metal compound is carried out in solution by an organic reducing agent.

15. A process according to claim 1, in which the feed to be treated is brought into contact with the catalyst at a pressure in the range from atmospheric pressure to 6 MPa and at a temperature in the range 20° C. to 200° C. with a mass flow rate of treated feed per unit mass of catalyst in the range 0.1 to 10 kg/kg/h.

16. A process according to claim 1, in which the feeds to be treated are $C_2$ or $C_3$ steam cracking feeds.

17. A process according to claim 1, in which the feed to be treated is a $C_4$ steam cracking feed.

18. A process according to claim 1, in which the feeds to be treated are $C_5$–$C_8$ steam cracking gasoline feeds.

19. A process according to claim 1, in which the feed to be treated is a catalytic cracking $C_3$ cut.

20. A process according to claim 1, in which the feed to be treated is a $C_4$ catalytic cracking cut.

21. A process according to claim 1, in which the feeds to be treated are $C_5$–$C_8$ catalytic cracking gasoline cuts.

* * * * *